United States Patent [19]

Schiffmann et al.

[11] 4,271,203

[45] Jun. 2, 1981

[54] MICROWAVE PROOFING AND BAKING BREAD UTILIZING METAL PANS

[75] Inventors: Robert F. Schiffmann, Manhattan; Alfred H. Mirman, Nanuet; Richard J. Grillo, Hawthorne, all of N.Y.

[73] Assignee: International Telephone and Telegraph Corporation, New York, N.Y.

[21] Appl. No.: 50,396

[22] Filed: Jun. 20, 1979

Related U.S. Application Data

[63] Continuation of Ser. No. 700,942, Jun. 29, 1976, abandoned.

[51] Int. Cl.³ .............................................. A21D 8/06
[52] U.S. Cl. .................................. 426/243; 426/241; 219/10.55 M
[58] Field of Search ............................ 426/241-243, 426/391, 502, 503, 523, 234; 219/10.55 A, 10.55 E, 10.55 M

[56] References Cited

U.S. PATENT DOCUMENTS

| | | | |
|---|---|---|---|
| 3,556,817 | 1/1971 | Jeppson | 426/241 |
| 3,699,899 | 10/1972 | Schiffmann et al. | 219/10.55 A X |
| 3,854,623 | 12/1974 | Levinson | 219/10.55 E |

OTHER PUBLICATIONS

Levinson, Melvin, "Aluminum the Wonder Metal of Microwave Cooking,".
Pyler, Baking Science & Technology, 1973, vol. II, Aubel Publ. Co., Chicago, pp. 671-680, 764-766, 1180.
Decareau et al., Potential Applications of Microwave Energy to the Baking Industry Journal of Microwave Power 3(3), 1968, pp. 152-157.

*Primary Examiner*—Joseph M. Golian
*Attorney, Agent, or Firm*—John T. O'Halloran; Alfred C. Hill

[57] ABSTRACT

A method of proofing and baking bread in metal pans using microwave energy as described. Overall proofing and baking time are reduced by a method combining conventional and microwave proofing of the bread loaves prior to conventional and microwave baking. Significant reduction in processing time results when the bread is conventionally and microwave proofed and conventionally and microwave energy baked.

2 Claims, No Drawings

MICROWAVE PROOFING AND BAKING BREAD UTILIZING METAL PANS

CROSS-REFERENCE TO RELATED APPLICATIONS

This is a Continuation Application of application Ser. No. 700,942, filed June 29, 1976 (now abandoned).

BACKGROUND OF THE INVENTION

The baking of bread, as in many other cases involving convective/conductive heat transfer, is very wasteful of heat energy. In order to bake the bread, it is necessary to first heat the walls of the oven and the air within the oven so that this heat energy may be transferred to the surface of the bread and then slowly carried to the interior via conductive heat transfer. The process is largely limited by the rate at which heat can be conducted from the surface of the bread to the interior. While the process can be speeded up somewhat in a conventional oven through the use of higher ambient temperatures, this is rapidly limited by the temperature at which the surface begins to brown excessively and bakeout becomes too high, as the major negative effects. The result of this is that white bread is conventionally baked for 17 to 23 minutes at 400° F. to 415° F.

Early experiments in baking bread involved the serial application of microwaves and conventional heat, i.e., first applying microwaves to obtain the oven spring and setting the structure and then finish baking with conventional heat to obtain the much needed crust color. While some degree of success was seen, particularly the 915 MHz frequency, the finished loaves left much to be desired since they tended to collapse, had poor rubbery interior structues and very rough unusual crust characteristics. The initial work was done using "Pyrex" and "Corning Ware" type baking dishes, however, there was excessive collapse due to poor sidewall formation. A significant improvement was made using paperboard containers, however, according to the invention a quantum jump in improvement of product quality began with the use of metal baking pans. This is contrary to all accepted practice in microwave processing. Two publications: K. Lorenz et al, "Baking With Microwave Energy", *Food Technology*, December, 1973; and T. H. Collins, "Exploring the Baking of Bread with Microwaves", *FMBRA Bulletin* (3), P. 175, 1970; both describe the use of metal baking pans for bread baking in a microwave field as an impossibility since the microwaves will only penetrate the dough through the top and not bake evenly.

The baking of bread is a process which is conventionally a very lengthy operation. Two steps in the process: The proofing of the loaves and the baking of the loaves are especially wasteful of time and energy as done conventionally. Proofing time is limited by the slow march of heat via conductive heat transfer into the center of the loaf. Sine the ambient temperature within the proofer must be kept relatively low, i.e. no more than 135° F. to 140° F. so as to avoid excessive drying of the skin and thermal destruction of the yeast, the driving force for heat transfer is small and proofing times of about one hour for a one pound loaf are common. Baking time is also limited by the ambient conditions in order to avoid excessive darkening of the crust. Baking times of 18 to 22 minutes are common for a one pound loaf. Microwave power, through its unique volume heating means, seemed the ideal way to speed up both these processes and this especially so since we discovered a means of heating the dough in metal pans in the microwave oven.

While our experimentation was initially directed at using microwave power for the entire proofing process and thereby shortening it to one tenth or less than the conventional proofing time, we found that this was not possible. What was discovered, however, was that if the dough was first partially proofed by conventional means, then microwave power could be use to finish the proofing process in a significantly shorter total proofing time.

SUMMARY OF THE INVENTION

Only after the novel process development of simultaneous baking utilizing metal pans using microwave energy and conventional oven heat was developed was a product success achieved. The addition of microwave proofing in combination with conventional proofing material reduced the time necessary for satisfactory proofing of the dough. Secondly, it has been discovered that the high temperature within the conventional oven can bake the sides, bottom and top crust of the loaves, and that microwave energy can be employed to set the center of the loaves through a selective application of low level microwave power at slightly higher than conventional oven temperatures. The overall effect of the process of this invention has been to shorten the bread processing time resulting in increased plant and oven capacity for commercial production. The resulting loaves baked by the novel process of this invention are well shaped, show good grain, crust and sidewall formation with no collapse.

It is an object of this invention to shorten bread processing time utilizing conventional metal baking pans.

A further object of this invention is to utiize microwave energy to reduce proof time and thereby improve overall bread processing time.

A still further object is to partial proof by conventional techniques and to finish proofing with microwave energy thereby decreasing by a significant amount the overall bread processing time.

A still further object is to reduce bread processing time by combining conventional and microwave energy proofing with the simultaneous conventional oven heat and microwave energy baking.

It is another object of the invention to utilize the shortened proofing and shortened bread baking times obtainable through the use of microwave power to increase proofer capacity and/or oven capacity, and to substantially reduce energy costs while increasing productivity in less floor space.

According to the process of this invention, the proofing of bread can be accomplished through the steps of first partially proofing in a conventional proofing system followed by the completion of proofing through the simultaneous application of microwaves in the warm, humidity controlled air. This method reduces the proofing time by 30 to 40%, to about 35 minutes, and therefore, increases the production capacity by 43 to 67%. When followed by baking with microwaves and hot air simultaneously, the total processing time is again reduced since this new baking time is only 12 minutes instead of the conventional 18 to 22 minutes. Thus, the entire proofing and baking part of the process may be accomplished in as little as 47 minutes as opposed to conventional times which range about 75 minutes. Since the new process accomplishes this time savings while employing standard metal baking pans this becomes a significant opportunity for increasing processing efficiency. It has also been fund that this method improves the control of bakeout during the baking process.

DESCRIPTION OF THE PREFERRED EMBODIMENTS

A successful process to achieve microwave baking with metal pans requires critically conrolling the microwave power input, high temperature range and baking time. Both 915 MHz and 2450 MHz frequencies and combinations thereof can be used to achieve a successful product.

The present invention will be more readily understood from a consideration of the following specific examples which are given for the purpose of illustration and not to be considered as limiting the scope of the invention.

EXAMPLE I

PROCEDURE

One pound loaves were formed from a known bread dough mixture and each placed in individual metal baking pans. The loaves were then proofed in the metal pans utilizing microwave energy. Proofing was done in a Cober microwave unit with the ambient conditions being kept at approximately 100° F. and 60% RH. Tests were carried out utilizing the 915 MHz and 2450 MHz frequencies employing from 75 to 100 watts output power per pound loaf or a flux density of from 5 to 10 watt hours per pound.

RESULTS

No successful result could be achieved using microwave proofing alone. However, techniques developed utilizing conventional proofing from 30 to 35 minutes followed by 4 to 6 minute microwave proofing were successful. This compares favorably to conventional proofing time of from 50 to 60 minutes.

EXAMPLE II

PROCEDURE

The loaves which had been proofed utilizing first conventional and then microwave energy of Example I were then baked. The best results were obtained from loaves baked in a Hirst "Microaire" oven at an ambient temperature of 425° F. for about 12 minutes utilizing the 2450 MHz frequency and a microwave power of approximately 100 watts per pound loaf or a flux density of 20 watt hours per pound.

RESULTS

The finished loaves were of good volume, grain, bakeout, crust and eating quality. These results indicate that commercial application of the combined method of this invention is technically and economically feasible. Utilizing the process of this invention, the combined proofing and baking time was reduced from about 70 minutes to about 47 minutes.

EXAMPLE III

This example uses the same procedure up to the point of proofing as described in Example I. Then, the one pound dough pieces are placed in conventional metal bread baking pans, typically 4"×4"×8", and transferred to a microwave processing cavity which has been preconditioned to be useful as a bread proofer either with or without the use of microwave power. The loaves are allowed to proof for 30 minutes at 110° F. dry bulb and 100° F. wet bulb, with no microwave power being used. Then the microwave power is turned on for 3 to 4.5 minutes at an output power of 107 watts. This provides a microwave power flux density of 5.4 to 8.0 watt hours per pound of dough at a frequency of 915 MHz. The loaves are then transferred to a Hirst "Microaire" microwave oven and baked for 12 minutes at 440° F. utilizing a microwave power flux density of 10 watt hours per pound of dough. The finished loaves of bread are equal in texture, appearance, grain, loaf height, bakeout and eating quality to conventionally proofed and baked loaves.

EXAMPLE IV

Same procedure as in Example III, except the microwave proofing is at a frequency of 2450 MHz. The remainder of the parameters stayed the same and good results were obtained.

EXAMPLE V

Same formula and procedure as Example III was utilized. However, the microwave proofing energy was supplied at both the 915 MHz and 2450 MHz frequencies with the power output being divided between the two frequencies. All other parameters remain the same and the results were satisfactory.

EXAMPLE VI

Same procedure as described in connection with Example III were utilized up to the point of baking. The proofed loaves were transferred to a conventional bread baking oven where they are baked for 18 to 22 minutes at 415° F. to 440° F. The finished loaves of bread are equal in texture, appearance, grain, loaf height, bakeout and eating quality to conventionally proofed and baked loaves.

EXAMPLE VII

Same procedure as described in Example IV was employed with the exception that the finishing procedure described in Example VI was utilized with satisfactory results.

EXAMPLE VIII

The same procedure as described in Example V was employed up to the point of baking at which point the finishing was conducted as described in Example VI with satisfactory results.

During the work as represented by the above examples, variations in temperature and humidity during microwave proofing were looked at. It was found that the temperature and humidity are not very critical; that is, the successful results were obtained using temperatures from 85° F. to 120° F. and relative humidities in the range of 40% to 85%. Similarly, we found that we could utilize proofing times consisting of 20 to 40 minutes conventional proofing and 3 to 10 minutes of microwave proofing. The longer conventional proofing times utilized, the shorter microwave proofing times. Additionally, the microwave power flux densities for the proofing period varied from 5 watt hours per pound of dough to 10 watt hours per pound of dough. It will be appreciated that the higher flux densities were generally associated with longer microwave proofing times and shorter conventional proofing times.

While we have described above the principles of our invention in connection with specific apparatus, it is to be clearly understood that this description is made only by way of example and not as a limitation to the scope of our invention as set forth in the objects thereof and in the accompanying claims.

We claim:

1. A method for processing bread comprising the steps of:

forming a plurality of one pound loaves from a bread dough mixture;

placing each of said plurality of loaves in a different one of a plurality of metal baking pans;

partially proofing said plurality of loaves in said baking pans in a hot air oven at 85° F. to 120° F. with a relative humidity of 40% to 85% for a first time period of 20 to 40 minutes;

finish proofing said partially proofed plurality of loaves utilizing microwave energy having a frequency equal to 915 MHz and 2450 MHz simultaneously, a power of 75 to 107 watts per pound loaf divided between said two frequencies and a flux density of from 5 to 10 watt hours per pound for a second time period of 3 to 10 minutes; and baking said finish proofed plurality of loaves in a combined hot air and microwave oven at an air temperature of 415° F. to 440° F. and with microwave energy having a frequency equal to 915 MHz and 2450 MHz simultaneously, a power of 50 to 100 watts per pound loaf divided between said two frequencies and a flux density of from 5 to 10 watt hours per pound for a third time period of 11 to 13 minutes to achieve bake out and crust color.

2. A method according to claim 1, wherein said first time period is 30 to 35 minutes, said second time period is 3 to 6 minutes, said air temperature is 415° F. to 425° F., and said third time period is 12 minutes.

* * * * *